US012387894B2

(12) United States Patent
Potter et al.

(10) Patent No.: US 12,387,894 B2
(45) Date of Patent: Aug. 12, 2025

(54) METHOD AND APPARATUS FOR HANDLING CONTACTOR / RELAY CONTACT BOUNCE UNDER TRANSIENT CONDITIONS

(71) Applicant: Astronics Advanced Electronic Systems Corp., Kirkland, WA (US)

(72) Inventors: Frederick J. Potter, Trumbauersville, PA (US); Patrick Mills, Bradenton, FL (US)

(73) Assignee: Astronics Advanced Electronic Systems Corp., Kirkland, WA (US)

( * ) Notice: Subject to any disclaimer, the term of this patent is extended or adjusted under 35 U.S.C. 154(b) by 359 days.

(21) Appl. No.: 17/861,056

(22) Filed: Jul. 8, 2022

(65) Prior Publication Data

US 2024/0013994 A1 Jan. 11, 2024

Related U.S. Application Data

(60) Provisional application No. 63/219,684, filed on Jul. 8, 2021.

(51) Int. Cl.
*H01H 47/02* (2006.01)
*H01H 47/00* (2006.01)
(Continued)

(52) U.S. Cl.
CPC .......... *H01H 47/02* (2013.01); *H01H 47/002* (2013.01); *H01H 50/18* (2013.01); *H01H 50/44* (2013.01); *H01H 50/54* (2013.01)

(58) Field of Classification Search
CPC ...... H01H 47/00; H01H 47/002; H01H 47/02; H01H 47/06; H01H 50/18; H01H 50/44; H01H 50/54
(Continued)

(56) References Cited

U.S. PATENT DOCUMENTS 4,533,016 A * 8/1985 Betton .................... B60R 25/04 307/10.4
6,456,059 B1 * 9/2002 Blakely ................ G01R 15/183 324/754.29

(Continued)

FOREIGN PATENT DOCUMENTS

GB 817035 A 7/1959

OTHER PUBLICATIONS

International Search Report and Written Opinion for PCT Application No. PCT/US2022/036571 dated Oct. 4, 2022.

(Continued)

*Primary Examiner* — Tuan T Dinh
(74) *Attorney, Agent, or Firm* — Wiggin and Dana LLP

(57) ABSTRACT

The present invention detects contact bouncing in a contactor by measuring contact voltage fluctuations caused by the bouncing power delivery contacts controlled by the contactor. When these fluctuations are detected, a circuit causes a pull-in coil of the contactor to be temporarily re-energized to re-establish a higher magnetic field needed to pull and maintain the power delivery contacts into proper position, which eliminates the bouncing. Because of the high power required by the pull-in coil, the time that the pull-in coil is actuated is limited in order to avoid thermal damage to the coil or other electronic components. After the pull-in coil is activated to move the power delivery contacts into proper position, a lower magnetic field hold coil is instead energized to maintain the power delivery contacts in place. The time that the pull-in coil is activated is dynamic and correspond to each disturbance as the disturbance happens, or the time is a set time determined by a timer, or the time is controlled by a Pulse Width Modulation scheme.

18 Claims, 4 Drawing Sheets

(51) Int. Cl.
*H01H 50/18* (2006.01)
*H01H 50/44* (2006.01)
*H01H 50/54* (2006.01)
(58) Field of Classification Search
USPC .................................. 361/160, 166, 189–190
See application file for complete search history.

(56) References Cited

U.S. PATENT DOCUMENTS

| | | | | |
|---|---|---|---|---|
| 9,698,669 | B2 | 7/2017 | Meid | |
| 2007/0257628 | A1 | 11/2007 | Gofman et al. | |
| 2011/0102052 | A1 | 5/2011 | Billingsley et al. | |
| 2011/0315663 | A1 | 12/2011 | Bonjean | |
| 2013/0343096 | A1* | 12/2013 | Stuler | H02M 1/32 327/108 |
| 2014/0347767 | A1* | 11/2014 | Nakamura | H02H 7/1213 361/18 |
| 2015/0028877 | A1* | 1/2015 | McCormick | H01H 47/226 324/418 |
| 2016/0116524 | A1* | 4/2016 | Putz | H02M 5/42 324/537 |
| 2016/0203931 | A1* | 7/2016 | Ramsey | H01H 47/06 361/194 |
| 2019/0044461 | A1* | 2/2019 | Jaap | H01H 9/563 |
| 2021/0098214 | A1 | 4/2021 | Carlson et al. | |

OTHER PUBLICATIONS

European Supplementary Search Report for corresponding Application No. 22838489.7, dated Apr. 3, 2025.

* cited by examiner

FIG. 1 – PRIOR ART

METHOD AND APPARATUS FOR HANDLING CONTACTOR / RELAY CONTACT BOUNCE UNDER TRANSIENT CONDITIONS

CROSS-REFERENCE TO RELATED APPLICATIONS

This application claims the benefit under 35 U.S.C. § 119(e) of Provisional Application Ser. No. 63/219,684, filed Jul. 8, 2021, the entire contents of which are hereby incorporated by reference as if fully set forth herein.

FIELD OF THE INVENTION

The present invention generally relates to contactors, and more specifically relates to addressing disturbance effects causing bouncing contacts in contactors.

BACKGROUND OF THE DISCLOSURE

A contactor is essentially a switch that is actuated by powering an electromagnet, which in turn pulls a conductive bar across two contacts, bridging them and allowing power to flow across them into a load. In some applications, a contactor is used to selectively deliver power to a particular load. Firing a military aircraft's guns causes a high transient vibration and is one instance where an onboard contactor's contacts can bounce or chatter during the vibration event. This causes damaging contact arcing and creates power transients to the loads that the contactor is powering. Contact bounce can be partially mitigated by special vibration dampening mounts for the contactors, however, such mitigation is often insufficient and/or unreliable.

As illustrated in FIG. 1, an exemplary contactor 100 for high currents has two magnetic coils, usually arranged is series, to magnetically close the contacts and to keep them closed while providing power to the loads. The first coil, called the pull-in coil 102, creates a high magnetic field to rapidly close the contacts. The second coil, called the hold coil 104, creates a lower magnetic field to keep or maintain the contacts in a closed state once they have already been closed by the pull-in coil 102. The hold coil 104 is shorted by closing switch 108. Typically, when it is desired to deliver power to a particular load, a signal is applied to cause switch 108 to close for some period of time. This results in the pull-in coil 102 setting the higher magnetic field needed to move and close the contacts used to provide power to the load. The two-coil arrangement is required to minimize the power dissipated by the electromagnet, as the high initial magnetic field for the pull-in coil 102 requires a great deal of power to create and is not needed to hold the contacts in place after the contactor has closed and only the hold coil 104 needs to be energized.

Once the power delivery contacts are closed and power is being delivered to the load, the switch 108 is opened, thereby allowing the hold coil 104 to set a lower magnetic field sufficient to energize the hold coil 104 (but not the pull-in coil 102) in order to keep the power delivery contacts closed. In contrast to the pull-in coil 102, the hold coil 104 needs a much smaller magnetic field in order to keep or maintain the closed contacts in a closed state. Under high vibration conditions or other disturbances, the power delivery contacts may bounce or chatter, or otherwise move, resulting in arcing, power transients, or other undesirable conditions. Since during this time, the contactor is operating using only a lower magnetic field hold coil 104, the contactor may not be able to sufficiently move the power delivery contacts, which otherwise requires the higher magnetic field pull-in coil 102. This results in interrupted power delivery. Fully engaging the pull-in coil 102 all the time is also undesirable, as it results in an excessive amount of power being consumed, as well as generating high levels of thermal energy which in turn may cause additional undesirable faults or conditions.

SUMMARY OF THE INVENTION

The present invention addresses these and other noted deficiencies in conventional power delivery contactor arrangements. In an embodiment, the present invention detects contact bouncing by measuring contact voltage fluctuations caused by the bouncing contacts. When these fluctuations are detected, a circuit causes the pull-in coil to be temporarily re-energized to re-establish the higher magnetic field needed to pull the contacts tighter together, which eliminates the bouncing. Because of the high power required by the pull-in coil, the time that it is actuated is limited in order to avoid thermal damage to the coil or other electronic components.

BRIEF DESCRIPTION OF THE DRAWINGS

For a more complete understanding of the present invention, the objects and advantages thereof, reference is now made to the following descriptions taken in connection with the accompanying drawings in which.

DETAILED DESCRIPTION OF EMBODIMENTS OF THE INVENTION

Disclosed are several embodiments of the present invention which may be used to selectively control the actuation of the pull-in coil in a contactor arrangement, in order to minimize the heat produced when delivering power to a load under conditions in which disturbances may affect the delivery of the power and/or the operation of the contactor.

Figure 1:
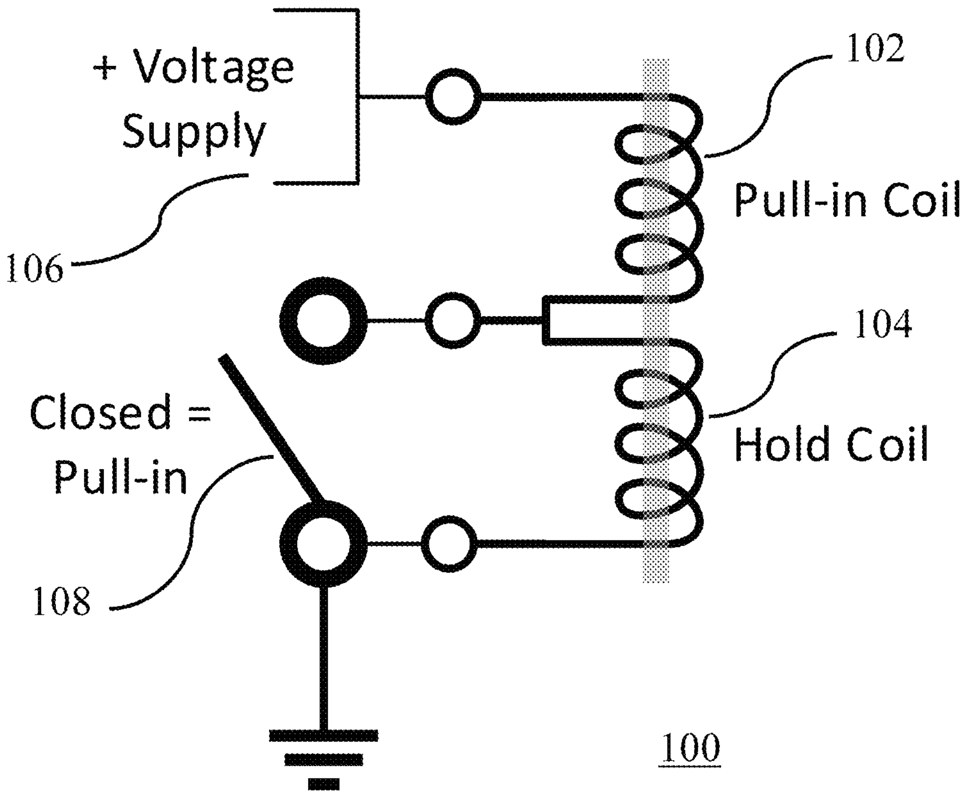
FIG. 1 is a schematic diagram of a prior art contactor.
Figure 2:
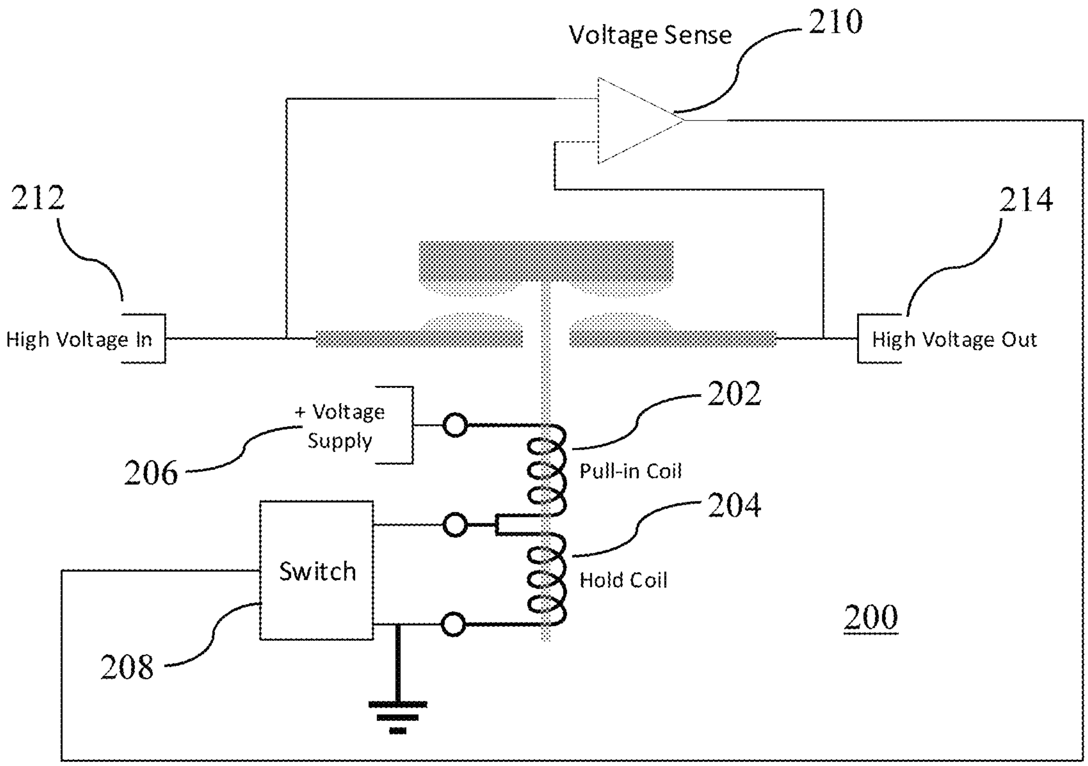
FIG. 2 is a schematic diagram of an improved contactor control according to a first embodiment of the present invention.

Referring now to FIG. 2, therein is illustrated a schematic diagram of a first embodiment according to the present invention. As shown in FIG. 2, the contactor 200 includes a pull-in coil 202 and a hold coil 204, as described above in connection with FIG. 1. However, in this embodiment, a voltage sense 210, such as, for example, a differential amplifier, may be used to selectively activate switch 208, which in turn selectively shorts or opens hold coil 204. The inputs to voltage sense 210 are high voltage in 212 and high voltage out 214. High voltage in 212 represents the vehicle or aircraft's power bus, akin to the "hot wire" as is commonly known in electrical systems, while the high voltage out 214 represents the voltage at the load, or what is sometimes referred to as the load connection. Under normal operating conditions when power is being delivered to a load, high voltage in 212 should essentially be the same as high voltage out 214, resulting in no (or negligible) output from voltage sense 210. As a result, switch 208 is otherwise unchanged, the hold coil 204 is energized and the contacts controlled by the hold coil 204 are closed in order to deliver power to the load.

If a disturbance occurs while power is being delivered to a load, this will typically cause a difference between the voltages seen at high voltage in 212 and high voltage out 214. This voltage difference is detected by voltage sense 210, causing its output to activate, which in turn activates switch 208 to a closed position, thereby shorting hold coil 204, and allowing pull-in coil 202 to increase the magnetic field, thereby moving the power delivery contacts back into place in order to reliably deliver power to the selected load. As soon as the power is properly delivered to the selected load, then the high voltage out 214 should revert back to essentially being the same as high voltage in 212. As soon as this voltage equilibrium is obtained, the differential input to voltage sense 210 will become negligible. As a result, the output of voltage sense 210 will be deactivated, which in turn will cause deactivation of switch 208. As soon as switch 208 is deactivated, the hold coil 204 is no longer shorted and will act to set the magnetic field at a much lower level than what was needed by pull-in coil 202.

As long as no additional disturbances or vibrations are encountered, the power delivery contactor will continue under normal operation, with power being delivered to the load, while only hold coil 204 is energized by way of a lower magnetic field, as compared with the much higher magnetic field required by pull-in coil 202. As soon as another disturbance or vibration is detected, this will typically manifest as a voltage difference between high voltage in 212 and high voltage out 214, and voltage sense 210 will have its output activated, and the process will continue as described above, by closing switch 208 and causing the pull-in coil 202 to energize once again. In this way, every disturbance or vibration is sensed, for example, by way of a voltage difference, and the contactor reset to energize the pull-in coil 202.

Figure 3:
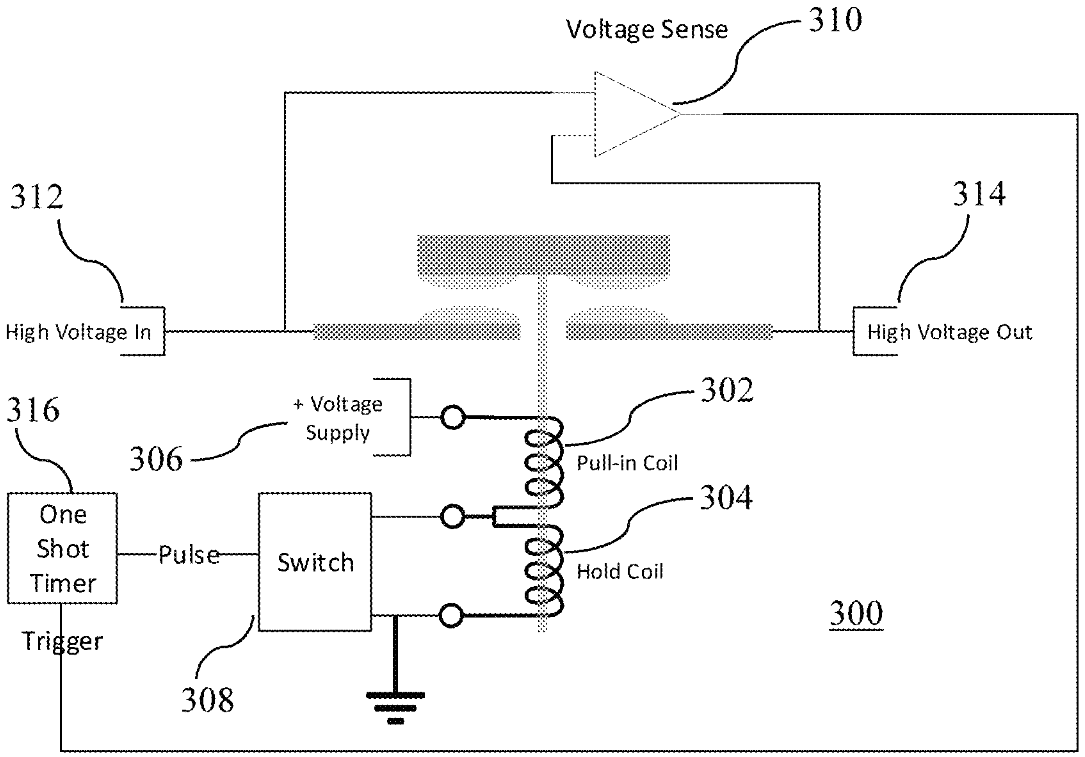
FIG. 3 is a schematic diagram of an improved contactor control according to a second embodiment of the present invention.

FIG. 3 presents an alternative embodiment, which operates much in the same way as that of FIG. 2. The similar elements in FIG. 3 are labelled using similar numbering as that used in FIG. 2. Referring specifically to FIG. 3, the output of voltage sense 310 is instead used to activate a one shot timer 316, which in turn activates switch 308, instead of activating switch 308 directly, as is similarly performed in the embodiment of FIG. 2. In the embodiment of FIG. 3, once the disturbance or vibration is detected, for example, by voltage sense 310, the output of voltage sense 310 is used to activate a one shot timer, which may be programmed to provide an active output for a preselected amount of time. This active output of the one shot timer 316 is what is used to close switch 308, which in turn shorts the hold coil 304, causing the pull-in coil 302 to set a much higher magnetic field to thereby cause the power delivery contacts to move back into or be maintained in their proper position. In this way, a disturbance or vibration condition may be used to re-energize pull-in coil 302 for a specific period of time, as opposed to the embodiment of FIG. 2, which essentially acts in real-time or near real-time to deal with each disturbance or vibration event as it occurs. The embodiment of FIG. 3 may be advantageous in environments where it is known that successive disturbances may occur, or alternatively, that multiple disturbances may occur within a relatively short period of time. Instead of having to move the power delivery contacts repeatedly, they are moved once based on the time set for the one shot timer 316. If the high vibration continues to exist after this time limit is reached and the contacts resume bouncing, the pull-in coil 302 may be re-energized for another time interval.

Figure 4:
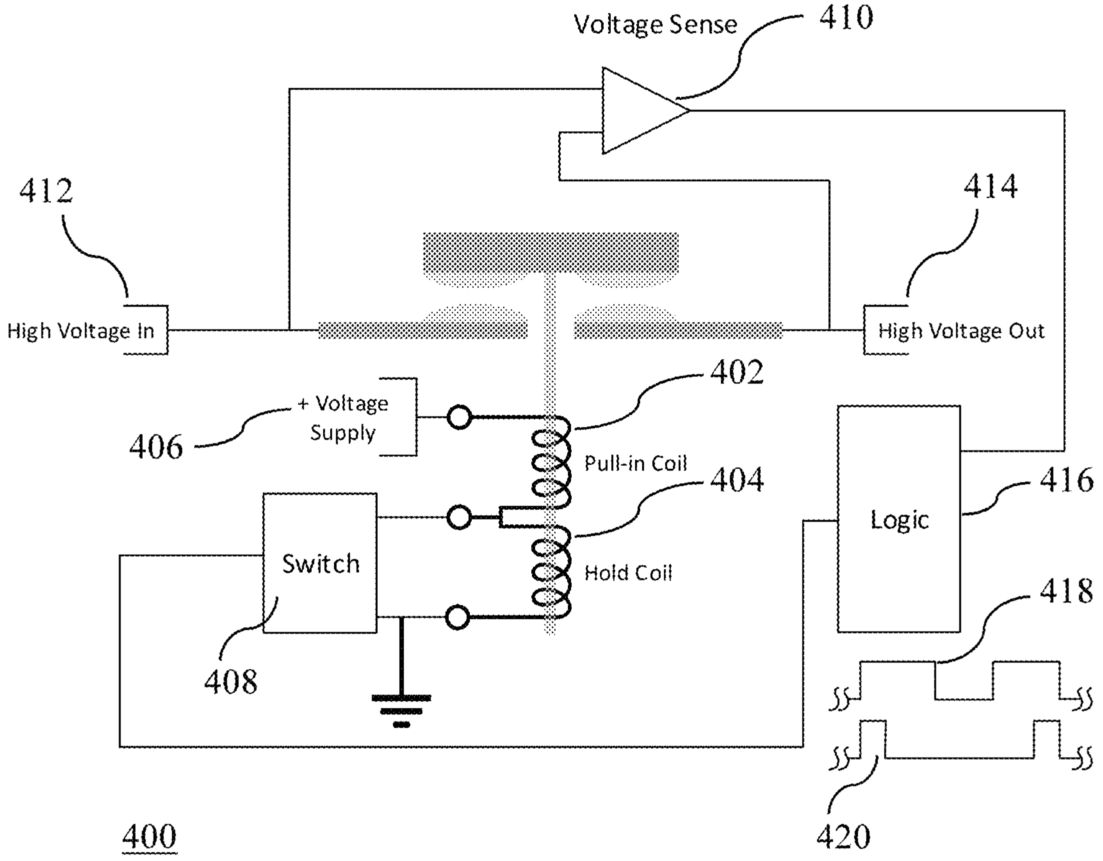
FIG. 4 is a schematic diagram of an improved contactor control according to a third embodiment of the present invention

Referring now to FIG. 4, therein is illustrated yet another alternative embodiment similar to the above-described embodiments, but where the pull-in coil 402 is provided with a reduced average current that provides a much higher magnetic field than that created by the hold coil 404 alone, but is less than that provided from fully actuating the pull-in coil 402. FIG. 4 presents an alternative embodiment, which operates much in the same way as that of FIG. 2. The similar elements in FIG. 4 are labelled using similar numbering as that used in FIG. 2. Referring specifically to FIG. 4, the output of voltage sense 410 is instead used to activate a logic circuit 416, which in turn provides a pulse-width modulated (PWM) output, such as signal sequence 418 and 420. The PWM signal, such as 418 or 420, is in turn used to activate switch 408, and thereby short hold coil 404 when it is needed to have pull-in coil 402 set a higher magnetic field to cause the power delivery contacts to move back in or be maintained in their proper position. The PWM approach of FIG. 4 still utilizes much less current and generates much less thermal energy than having pull-in coil 402 be constantly energized. This is because the pull-in coil 402 is being energized for only part of a time period. The ON time of the period, otherwise referred to as the duty cycle, may be set based on the particular requirements or desired operation of a system.

As described above in connection with the various embodiments, the amount of current required to hold the power delivery contacts closed may be pre-determined based on the aircraft or vehicle design Also, a software algorithm or digital logic can be made to start reducing the current to the pull-in coil after a set amount of time, reducing it to zero if the vibration has ceased, or alternatively, increasing the current again if contact chatter resumes.

It will be understood that the embodiments disclosed in this specification extend to all alternatives and combinations. It will be further understood by those of ordinary skill in the art that the present invention is susceptible to broad utility and application. Many embodiments and variations of the present invention other than those described herein, as well as many adaptations, variations and equivalent arrangements, will be apparent from or reasonably suggested by the present invention and its description, without departing from the substance or scope of the present invention.

Accordingly, while the present invention has been described herein in detail in connection with exemplary embodiments, it is to be understood that the present disclosure is only illustrative and exemplary of the present invention and is made to provide a sufficiently enabling disclosure. Further, the foregoing description is not intended to be construed or limited to the present invention, or to exclude any adaptations, modifications, or equivalents thereof

We claim:

1. A circuit arrangement capable of reducing contact bounce in a contactor resulting from a transient condition, the circuit arrangement comprising:

a contactor having a first magnetic coil electrically connected to a second magnetic coil, one or both of the coils configured to close contacts when power is to be provided to a load, the first magnetic coil generating a higher magnetic field than the second magnetic coil:

a switch configured to selectively electrically short the second coil to allow the first coil to generate the higher magnetic field;

a voltage sensor configured to detect voltage fluctuations caused by the transient condition, the voltage sensor having an output used to selectively activate the switch to thereby energize the first coil to generate the higher magnetic field; and wherein the first coil includes a pull-in coil and the second coil includes a hold coil, the pull-in coil and the hold coil being connected in series.

2. The circuit arrangement of claim 1, wherein the voltage sensor comprises a differential amplifier having a first input in electrical communication with a power bus and a second input in electrical communication with a load voltage connection, the output of the differential amplifier configured to indicate a difference in voltage between the power bus and the load voltage connection.

3. The circuit arrangement of claim 2, wherein the pull-in coil is temporarily energized when the disturbance is detected and de-energized when the disturbance is no longer detected.

4. A circuit arrangement capable of reducing contact bounce in a contactor resulting from a transient condition, the circuit arrangement comprising:

a contactor having a first magnetic coil electrically connected to a second magnetic coil, one or both of the coils configured to close contacts when power is to be provided to a load, the first magnetic coil generating a higher magnetic field than the second magnetic coil;

a switch configured to selectively electrically short the second coil to allow the first coil to generate the higher magnetic field;

a voltage sensor configured to detect voltage fluctuations caused by the transient condition, the voltage sensor having an output used to selectively activate a timer, which in turn activates the switch for a selectable period of time to thereby energize the first coil to generate the higher magnetic field; and wherein the first coil includes a pull-in coil and the second coil includes a hold coil, the pull-in coil and the hold coil being connected in series.

5. The circuit arrangement of claim 4, wherein the voltage sensor comprises a differential amplifier having a first input in electrical communication with a power bus and a second input in electrical communication with a load voltage connection, the output of the differential amplifier configured to indicate a difference in voltage between the power bus and the load voltage connection.

6. The circuit arrangement of claim 5, wherein the pull-in coil is temporarily energized when the disturbance is detected and de-energized after the selectable period of time has run.

7. A circuit arrangement capable of reducing contact bounce in a contactor resulting from a transient condition, the circuit arrangement comprising:

a contactor having a first magnetic coil electrically connected to a second magnetic coil, one or both of the coils configured to close contacts when power is to be provided to a load, the first magnetic coil generating a higher magnetic field than the second magnetic coil;

a switch configured to selectively electrically short the second coil to allow the first coil to generate the higher magnetic field;

a voltage sensor configured to detect voltage fluctuations caused by the transient condition, the voltage sensor having an output used to activate a pulse width modulator have a selectable duty cycle, an output of the pulse width modulator selectively activating the switch on and off according to the duty cycle to thereby energize the first coil to generate the higher magnetic field; and wherein the first coil includes a pull-in coil and the second coil includes a hold coil, the pull-in col and the hold coil being connected in series.

8. The circuit arrangement of claim 7, wherein the voltage sensor comprises a differential amplifier having a first input in electrical communication with a power bus and a second input in electrical communication with a load voltage connection, the output of the differential amplifier configured to indicate a difference in voltage between the power bus and the load voltage connection.

9. The circuit arrangement of claim 8, wherein the pull-in coil is temporarily energized when the disturbance is detected and de-energized in accordance with the selectable duty cycle of the pulse width modulator.

10. A method of reducing contact bounce in a contactor resulting from a transient condition, the method comprising the following steps:

utilizing a contactor having a first magnetic coil electrically connected to a second magnetic coil, one or both of the coils configured to close contacts when power is to be provided to a load, the first magnetic coil generating a higher magnetic field than the second magnetic coil;

selectively operating a switch configured to selectively electrically short the second coil to allow the first coil to generate the higher magnetic field;

utilizing a voltage sensor configured to detect voltage fluctuations caused by the transient condition, the voltage sensor having an output used to selectively activate the switch to thereby energize the first coil to generate the higher magnetic field; and wherein the first coil includes a pull-in coil and the second coil includes a hold coil, the pull-in coil and the hold coil being connected in series.

11. The method of claim 10, wherein the voltage sensor comprises a differential amplifier having a first input in electrical communication with a power bus and a second input in electrical communication with a load voltage connection, the output of the differential amplifier configured to indicate a difference in voltage between the power bus and the load voltage connection.

12. The method of claim 11, wherein the pull-in coil is temporarily energized when the disturbance is detected and de-energized when the disturbance is no longer detected.

13. A method of reducing contact bounce in a contactor resulting from a transient condition, the method comprising the following steps:

utilizing a contactor having a first magnetic coil electrically connected to a second magnetic coil, one or both of the coils configured to close contacts when power is to be provided to a load, the first magnetic coil generating a higher magnetic field than the second magnetic coil;

selectively operating a switch configured to selectively electrically short the second coil to allow the first coil to generate the higher magnetic field;

utilizing a voltage sensor configured to detect voltage fluctuations caused by the transient condition, the voltage sensor having an output used to selectively activate a timer, which in turn activates the switch for a selectable period of time is thereby energize the first coil to generate the higher magnetic field; and wherein the first coil includes a pull-in coil and the second coil includes a hold coil, the pull-in coil and the hold coil being connected in series.

14. The method of claim 13, wherein the voltage sensor comprises a differential amplifier having a first input in electrical communication with a power bus and a second input in electrical communication with a load voltage connection, the output of the differential amplifier configured to indicate a difference in voltage between the power bus and the load voltage connection.

15. The method of claim 14, wherein the pull-in coil is temporarily energized when the disturbance is detected and de-energized after the selectable period of time has run.

16. A method of reducing contact bounce in a contactor resulting from a transient condition, the method comprising the following steps:

utilizing a contactor having a first magnetic coil electrically connected to a second magnetic coil, one or both of the coils configured to close contacts when power is to be provided to a load, the first magnetic coil generating a higher magnetic field than the second magnetic coil;

selectively activating a switch configured to selectively electrically short the second coil to allow the first coil to generate the higher magnetic field;

utilizing a voltage sensor configured to detect voltage fluctuations caused by the transient condition, the voltage sensor having an output used io activate a pulse width modulator having a selectable duty cycle, an output of the pulse width modulator selectively activating the switch on and off according to the duty cycle to thereby energize the first coil to generate the higher magnetic field; and wherein the first coil includes a pull-in coil and the second coil includes a hold coil, the pull-in coil and the hold coil being connected in series.

17. The method of claim 16, wherein the voltage sensor comprises a differential amplifier having a first input in electrical communication with a power bus and a second input in electrical communication with a load voltage connection, the output of the differential amplifier configured to indicate a difference in voltage between the power bus and the load voltage connection.

18. The method of claim 17, wherein the pull-in coil is temporarily energized when the disturbance is detected and de-energized in accordance with the selectable duty cycle of the pulse width modulator.

* * * * *